O. M. OTTE.
GOGGLE FRAME.
APPLICATION FILED MAR. 3, 1916.
1,206,135.
Patented Nov. 28, 1916.
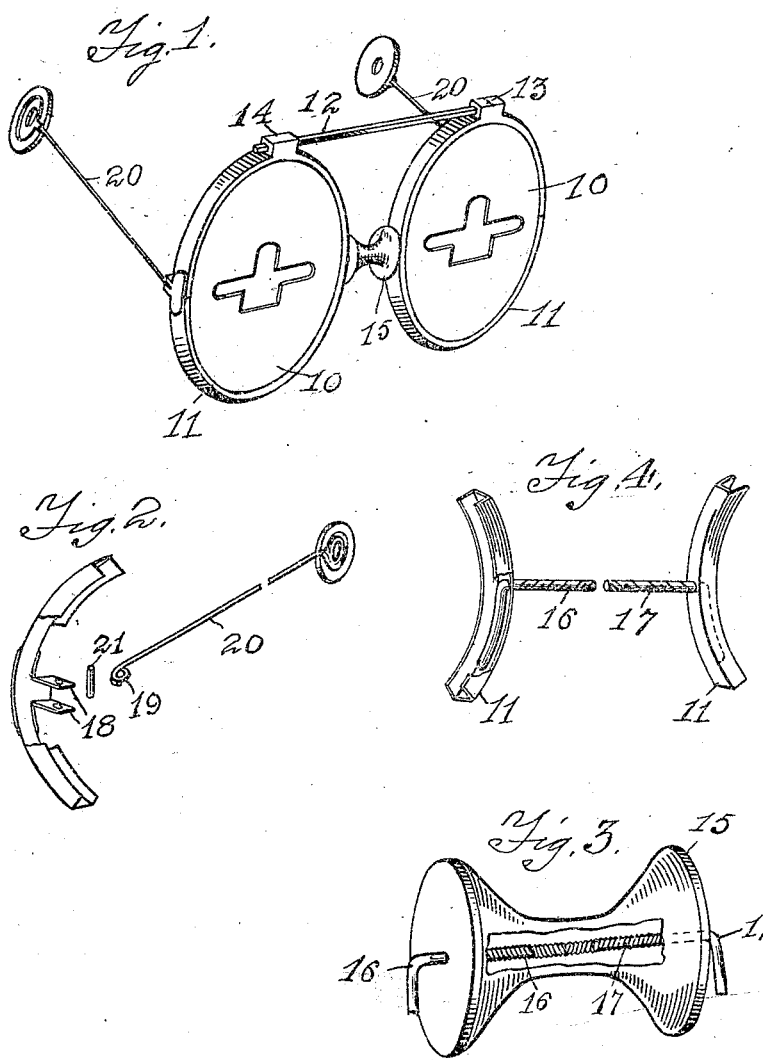
Witnesses
H. A. Sandberg
C. C. Hultgren
Inventor
Otho M. Otte
By S. Arthur Baldwin
Attorney

UNITED STATES PATENT OFFICE.

OTHO M. OTTE, OF JAMESTOWN, NEW YORK.

GOGGLE-FRAME.

1,206,135.

Specification of Letters Patent.

Patented Nov. 28, 1916.

Application filed March 3, 1916. Serial No. 81,832.

*To all whom it may concern:*

Be it known that I, OTHO M. OTTE, a citizen of the United States, residing at the city of Jamestown, in the county of Chautauqua and State of New York, have invented certain new and useful Improvements in Goggle-Frames, of which the following, taken in connection with the accompanying drawings, is a specification.

The invention relates to frames for goggles for shielding the eyes of drivers of motor cars and other users whose eyes are subjected to the glare of bright lights; and the object of the improvement is to provide a frame which may be quickly and accurately adjusted to the width of eyesight of the user of the goggles and which holds said goggles firmly in line and in position before the eyes of the user, providing a novel yet firm nose piece for said frame, and the invention consists in the novel features and combinations hereinafter set forth and claimed.

In the drawings, Figure 1 is a perspective view of the goggles showing the construction and arrangement of the frames. Fig. 2 is a detail of a portion of the rim of one of the goggles showing the manner of attachment for the bow and one of the bows detached from said rim, with the pin for attaching the same. Fig. 3 is a perspective view of the nose piece which is shaped like a spool to fit the bridge of the nose on all sides, and the central portion is broken away to show the right and left threads for adjusting the distance between the two goggles; and Fig. 4 is a perspective view of the oppositely projecting pins on the goggle rims, a portion of each of the rims being shown and also showing the manner of attachment of said pins to said rims and the right and left threads on said pins.

Like characters of reference refer to corresponding parts in the several views.

The numeral 10 designates the limited vision goggle which has the central cross-shaped slotted clearance in line with the center of vision, the remainder of the goggle 10 being opaqued to protect the eye of the user as shown and claimed in my application for Letters Patent Serial No. 81,829.

The numeral 11 designates the rim of each of the pair of goggles which is preferably made of thin sheet metal or some equally good material which has sufficient strength to hold the goggles firmly in position and support the bows 10 and also the adjustable connection or nose piece between the goggles.

The goggle rims 11 are adjustably attached to one another by means of a connecting bar or wire 12 which is firmly attached at one end in the lug 13 on one of the goggle rims 11, and slidably mounted in the lug 14 on the other goggle rim 11. The nose piece 15 is spool-shaped to fit the bridge of the nose and has a hole therethrough with right and left threads cut therein. The goggle rims 11 have short projecting pins 16 and 17 extending out therefrom in line with one another, and with right and left threads cut thereon to fit in the right and left threads in the hole in the nose piece 15.

It is now apparent that the nose piece 15 can be turned thereby moving the goggle rims to or from one another on the right and left screws, the rod 12 sliding back and forth in the lug 14. A pair of lugs 18 are provided for the looped end 19 of the wire bow 20 to receive the pin 21 therethrough and thereby attach the bow 20 between the lugs 18.

It is obvious that the frames can be made at low cost and quickly adjusted to the centers of vision of the eyesight of the wearer by turning the nose piece 15, after which the goggles are ready for use.

I claim as new:

1. A frame for goggles comprising rims for said goggles, a turnbuckle nose piece connecting said rims to adjust them to or from one another, and all sides of said nose piece shaped to fit the bridge of the nose.

2. A frame for goggles comprising a spool-shaped nose piece all sides of which fit the bridge of the nose, said nose piece having a hole therethrough with a right-hand thread in one end and a lefthand thread in the other end of said hole, pins having right and left threads to fit in said right and left threads in said hole, and means for attaching said pins to said goggles to move said goggles to or from one another by turning said nose piece.

3. A frame for goggles comprising rims for said goggles, oppositely projecting pins on said rims therebetween having right and left threads thereon, a nose piece all sides of which fit the bridge of the nose, said nose piece having a hole in each opposite end with right and left threads therein to fit said right and left threads on said pins to move said rims to or from one another by turning said nose piece.

4. A frame for goggles comprising rims for said goggles, oppositely projecting pins on said goggles therebetween having a righthand thread on one pin and a lefthand thread on the other, a nose piece spoolshaped having a continuous fit for the nose around said nose piece, said nose piece having a hole therethrough with a righthand thread in one end to fit said righthand thread on one of said pins and a lefthand thread in the other end to fit the lefthand thread on the other pin to move said goggles to and from one another by turning said nose piece.

5. A frame for goggles comprising rims for said goggles, oppositely projecting pins on said goggles having right and left threads cut thereon, a nose piece having a hole therein with right and left threads to fit said pins, a rod attached to one of said goggles and slidably attached to the other to hold the same in line, and suitable bows for said goggles.

6. A frame for goggles comprising rims for said goggles, oppositely projecting pins on said rims therebetween having right and left threads cut thereon, a spool shaped nose piece having a hole therein to fit said pins and right and left threads in the opposite ends of said hole to move said goggles to or from one another by turning said nose piece, and suitable bows attached to the outer sides of said goggles.

In testimony whereof I have affixed my signature in the presence of two witnesses.

OTHO M. OTTE.

Witnesses:
H. A. SANDBERG,
C. O. HULTGREN.